UNITED STATES PATENT OFFICE.

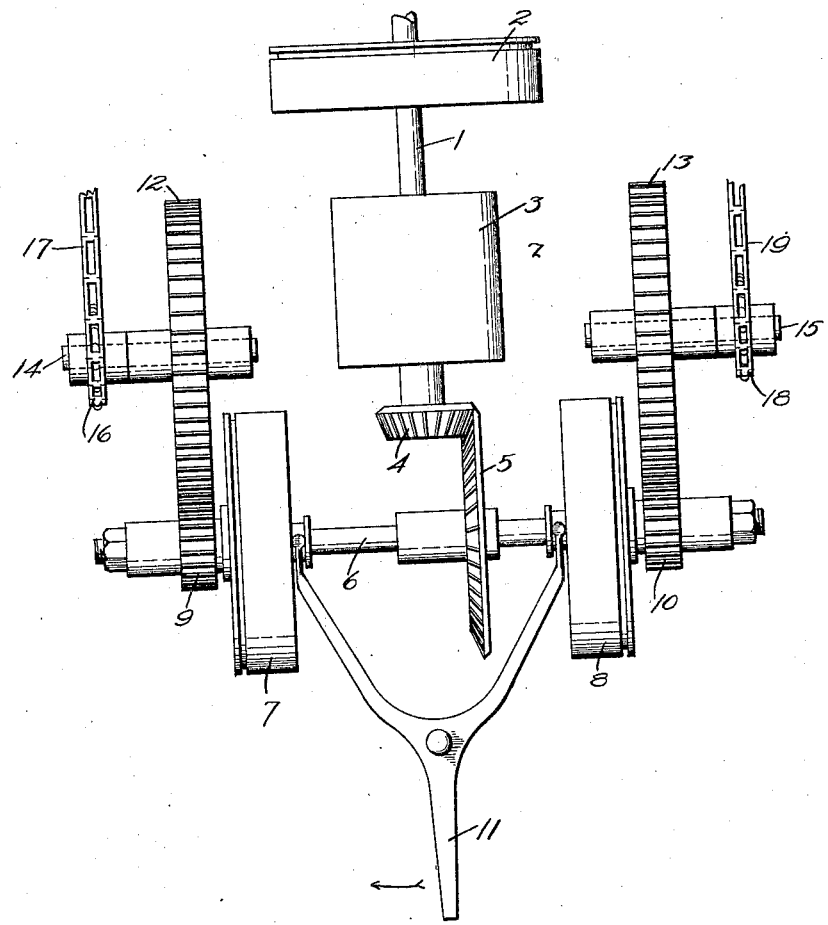

JOHN MINOR KROYER, OF STOCKTON, CALIFORNIA.

TRANSMISSION MECHANISM.

1,387,891.  Specification of Letters Patent.  Patented Aug. 16, 1921.

Application filed May 21, 1920. Serial No. 383,182.

*To all whom it may concern:*

Be it known that I, JOHN MINOR KROYER, a citizen of the United States, and a resident of Stockton, in the county of San Joaquin and State of California, have invented a new and useful Improvement in Transmission Mechanism, of which the following is a full, clear, and exact description.

My invention relates to improvements in transmission mechanism for tractors, and it consists in the combinations, constructions and arrangements herein described and claimed.

An object of my invention is to provide a novel form of transmission mechanism which is particularly adapted for that type of tractor set forth in my prior Patent No. 1308790 of July 8, 1919. In said prior patent I have disclosed a tractor in which power is applied to all four wheels, and in which the two wheels on one side of the device may be simultaneously disconnected while the other wheels are still being driven, thereby producing a turning effect which enables the tractor to be steered.

A further object of the present invention is to provide a transmission in which a maximum amount of power is delivered, owing to the simplicity of construction.

A further object of my invention is to provide a transmission in which the driving power of the two wheels on each side may be readily applied or removed.

Other objects and advantages will appear in the following specification, and the novel features of the invention will be particularly pointed out in the appended claim.

My invention is illustrated in the accompanying drawing, forming part of this application, which is a plan view of the transmission mechanism.

In carrying out my invention, I provide a drive shaft 1 having thereon a fly wheel 2. The shaft 1 is continued into a gear box 3 which contains speed change gears of the ordinary type. A pinion 4 which is driven through the medium of the mechanism in the gear box meshes with a beveled pinion 5 on a shaft 6.

Carried by the shaft 6 are clutches 7 and 8 which are normally arranged to drive the gears 9 and 10 respectively, but which may be moved in any suitable manner, as by means of a lever 11, so as to free one clutch while permitting the other clutch to still drive its pinion.

Arranged to mesh with the pinions 9 and 10 are gears 12 and 13 respectively on shafts 14 and 15 respectively. The shaft 14 bears a sprocket wheel 16 having a sprocket chain 17 running thereon, by means of which the wheels (not shown) on one side of the tractor are operated. The shaft 15 bears a similar sprocket 18 having a chain 19 which transmits motion to the wheels.

It will be seen that the arrangement described above is very simple. The clutches 7 and 8 may be of any suitable type, such as the ordinary multiple disk clutch.

From the foregoing description of the various parts of the device, the operation thereof may be readily understood. The pinion 4 transmits movement to the gear 5 which, in turn, operates the shaft 6. When the lever 11 is in the position shown in the figure, both clutches are engaged and drive a sprocket chain in the manner described. When it is desired to release the driving power from one side of the device, as, for instance, to stop the movement of the chain 17, the lever 11 may be shifted in the direction indicated by the arrow, whereupon the clutch 7 will be thrown out while the clutch 8 will still be engaged.

The showing of the lever 11 for manipulating the clutches is diagrammatical in its nature. Obviously any suitable mechanism for shifting the clutches might be used without departing from the spirit of the invention.

I claim:

A transmission mechanism comprising a drive shaft, a driven shaft set at right angles thereto and beyond one end thereof, gearing operatively connecting said shafts, a pinion loosely mounted on each end of the driven shaft, a clutch member secured to each pinion, a companion clutch member for each first named member splined on the driven shaft and facing each other, and a rocking lever for shifting said splined members fulcrumed in line with but beyond the drive shaft.

JOHN MINOR KROYER.